(12) United States Patent  (10) Patent No.: US 9,165,406 B1
Gray et al.  (45) Date of Patent: Oct. 20, 2015

(54) PROVIDING OVERLAYS BASED ON TEXT IN A LIVE CAMERA VIEW

(71) Applicant: A9.com, Inc., Palo Alto, CA (US)

(72) Inventors: Douglas R. Gray, Mountain View, CA (US); Arnab S. Dhua, Mountain View, CA (US); Yu Lou, Stanford, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 431 days.

(21) Appl. No.: 13/624,647

(22) Filed: Sep. 21, 2012

(51) Int. Cl.
 *G09G 5/00* (2006.01)
 *G06T 19/00* (2011.01)

(52) U.S. Cl.
 CPC .................................... *G06T 19/006* (2013.01)

(58) Field of Classification Search
 CPC ... G06F 3/023; G06F 17/27; G06F 17/30247; G06F 17/30253
 USPC .......................................................... 345/629
 See application file for complete search history.

(56) References Cited

U.S. PATENT DOCUMENTS

| | | | |
|---|---|---|---|
| 5,381,241 A * | 1/1995 | Kawanaka et al. ............ 358/462 |
| 6,185,666 B1 | 2/2001 | Murray et al. |
| 7,092,870 B1 | 8/2006 | Chen et al. |
| 7,685,109 B1 | 3/2010 | Ransil et al. |
| 7,716,168 B2 | 5/2010 | Selca et al. |
| 8,190,593 B1 | 5/2012 | Dean |
| 8,266,173 B1 | 9/2012 | Reztlaff et al. |
| 8,539,197 B1 | 9/2013 | Marshall et al. |
| 9,047,326 B2 | 6/2015 | Goldberg et al. |
| 2002/0103876 A1 | 8/2002 | Chatani et al. |
| 2007/0033340 A1 | 2/2007 | Tulskie et al. |
| 2007/0043923 A1 | 2/2007 | Shue |
| 2008/0086451 A1 | 4/2008 | Torres et al. |
| 2008/0243778 A1 | 10/2008 | Behnen et al. |
| 2009/0198670 A1 | 8/2009 | Shiffer et al. |
| 2010/0011368 A1 | 1/2010 | Arakawa et al. |
| 2010/0046842 A1 * | 2/2010 | Conwell ...................... 382/218 |
| 2010/0161569 A1 | 6/2010 | Schreter |
| 2010/0169361 A1 | 7/2010 | Chen et al. |
| 2010/0228721 A1 | 9/2010 | Mok et al. |
| 2011/0131202 A1 | 6/2011 | Cohen et al. |
| 2011/0137895 A1 * | 6/2011 | Petrou et al. .................. 707/723 |
| 2012/0011311 A1 | 1/2012 | Orikasa et al. |
| 2012/0072694 A1 | 3/2012 | Yochai et al. |
| 2012/0166751 A1 | 6/2012 | Matsumoto et al. |
| 2012/0191577 A1 | 7/2012 | Gonsalves et al. |
| 2013/0083999 A1 * | 4/2013 | Bhardwaj et al. ............. 382/165 |
| 2013/0097134 A1 | 4/2013 | Thompson et al. |

(Continued)

OTHER PUBLICATIONS

US Non-Final Office Action issued in U.S. Appl. No. 13/650,931 dated May 1, 2015.
US Non-Final Office Action issued in U.S. Appl. No. 13/650,931 dated Sep. 18, 2014.
US Notice of Allowance issued in U.S. Appl. No. 13/650,961 dated Feb. 9, 2015.

(Continued)

*Primary Examiner* — Ryan R Yang
(74) *Attorney, Agent, or Firm* — Hogan Lovells US LLP

(57) ABSTRACT

Approaches are described for rendering augmented reality overlays on an interface displaying the active field of view of a camera. The interface can display to a user an image or video, for example, and the overlay can be rendered over, near, or otherwise positioned with respect to any text or other such elements represented in the image. The overlay can have associated therewith at least one function or information, and when an input associated with the overlay is selected, the function can be performed (or caused to be performed) by the portable computing device.

24 Claims, 10 Drawing Sheets

(56) References Cited

U.S. PATENT DOCUMENTS

| | | | |
|---|---|---|---|
| 2013/0113943 A1* | 5/2013 | Wormald et al. | 348/207.1 |
| 2014/0025626 A1 | 1/2014 | Mefford et al. | |
| 2014/0108434 A1 | 4/2014 | Goldberg et al. | |
| 2014/0181071 A1 | 6/2014 | Pidduck et al. | |

OTHER PUBLICATIONS

US Non-Final Office Action issued in U.S. Appl. No. 13/650,961 dated Aug. 8, 2014.

PCT International Search Report and Written Opinion issued in Application Serial No. PC:T/US2013/064731.

* cited by examiner

PROVIDING OVERLAYS BASED ON TEXT IN A LIVE CAMERA VIEW

BACKGROUND

As people utilize a variety of computing devices it can be advantageous to adapt to the ways in which people interact with these devices. For example, users are accustomed to manually inputting phone numbers to make a phone call, manually typing an email address to send an email, and manually typing a web address into a web browser to view a web page. However, these tasks are often tedious and time consuming. As such, a variety of methods to save users time have been offered on these devices, such as assigning a phone number to a favorites list and bookmarking a Web address. As technology evolves and as the features and services offered on computing devices expand, the way in which shortcuts and other time saving methods are provided is changing.

BRIEF DESCRIPTION OF THE DRAWINGS

Various embodiments in accordance with the present disclosure will be described with reference to the drawings, in which.

DETAILED DESCRIPTION

Figure 1:
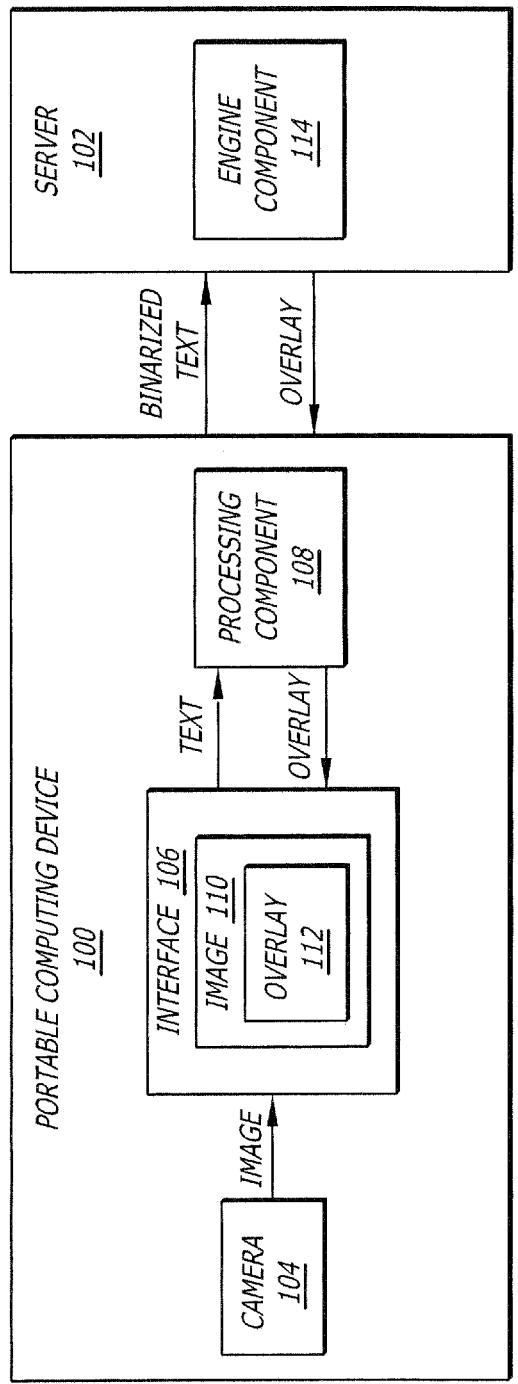
FIG. 1 illustrates an example system for providing augmented reality overlays based on a detected image in a live field of view of a camera, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing input to an electronic device. In particular, various embodiments enable a device, such as a portable computing device, to perform tasks such as processing an image to recognize and locate text in the image, identifying a text entity type (e.g., an email, phone number, URL, etc.) from the recognized text, providing an overlay on the image that corresponds to a function (e.g., calling a number, opening an internet browser, etc.) associated with the recognized text, and performing the function associated with the text when the overlay (or another such option or element) is selected.

In accordance with various embodiments, an overlay can be rendered on an interface displaying the active field of view of a camera. The interface can display to a user an image or video, for example, and the overlay can be rendered over, near, or otherwise positioned with respect to any text or other such elements represented in the image. The overlay can have associated therewith at least one function or information, and when an input associated with the overlay is selected, the function can be performed (or caused to be performed) by the portable computing device. For example, at least one camera might be integrated into the portable computing device, and the device can display an image that is currently being captured by the camera. The image can be processed to recognize text in the image, and a text entity type (e.g., a phone number, a URL, etc.) can be determined from the recognized text. The text entity type can be associated with an overlay that performs a function when selected, and the overlay can be rendered on the interface at the location corresponding to the text. When an input associated with the overlay is selected, the function associated with the overlay can be performed by the portable computing device.

For example, a user can view an advertisement using their portable mobile device, the advertisement having displayed thereon a phone number, a barcode of an advertised product, and a web address of the advertised product. When the user views the advertisement on the interface of the portable computing device, an overlay can be displayed above each area of recognized text in the advertisement. The overlay can be selected, and when selected, can cause the portable mobile device to perform a function. For example, the overlay above the phone number, when selected, can be used to make a call to the phone number displayed in the advertisement. Additionally or alternatively, selecting the overlay above the phone number can be used to store the phone number in the user's portable mobile device. The overlay above the barcode, when selected, can be used to open a web browser or other application to look up the product identified by the barcode. The overlay above the web address, when selected, can open a web browser at the web address displayed in the advertisement.

In accordance with other embodiments, this example can be extended to providing an overlay above: an email address, where when the overlay above the email address is selected, the overlay can be used to open a new message window to compose an email; a physical addresses, where when the overlay above the physical is selected a map application to display directions to address is opened; a receipt, where the overlay near the total due displays the amount due including tip; and various other actionable text entity types.

FIG. 1 illustrates an example system for providing augmented reality overlays based on a detected image in a live field of view of a camera, in accordance with an embodiment. As shown in FIG. 1, a portable computing device 100 is in communication with a server 102. The portable computing can device can be a mobile phone or any computing device that can be operated by a user. The server can be any type of server such as an application server, a web server, etc.

The portable computing device in this example includes a camera 104, an interface 106 (e.g., a display element) that displays the field of view of the camera, and a processing component 108. The camera can include a lens and an image sensor that converts an optical image into an electrical signal. The portable computing device can be aimed in different directions and the interface can display an image 110 of the current/active field of view being captured by the camera. It should be noted that the image is not a snapshot of the current/active field of view being captured by the camera; rather, the image is the current (or live) rendering of what the camera is being pointed at.

The processing component processes the image in the active field of view of the camera to detect text in the image. For example, the processing component can implement algorithms that detect and recognize the location of text in the image, and the region of the image that includes the text can be cropped to create a region of cropped text. The region of cropped text can be binarized. Thereafter, the region of binarized text is communicated to the server. Alternatively, in accordance with an embodiment, a grey scale image, color image or any other image (cropped or otherwise not cropped) can be communicated to the server (or remain on the portable computing device) for further processing.

In accordance with an embodiment, detecting text in the image can include locating regions of extremes (e.g., regions of sharp transitions between pixel values) such as the edges of letters. The regions of extremes, or the maximally stable extremal regions, can be extracted and analyzed to detect characters, where the detected characters can be connected and aggregated. A text line algorithm can be used to determine the orientation of the connected characters, and once the orientation of the characters is determined, a binary mask of the region containing the characters can be extracted. The binary mask can be converted into a black white representation, and the black white representation can be communicated to an optical character recognition engine for further processing.

In accordance with an embodiment, detecting text in an image can include more or fewer steps as described above. For example, text detection in an image can include performing glyph detection on the captured image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a crisp mask which can include any punctuation that may have been filtered out earlier due to the minimum size constraint.

In accordance with an embodiment, glyph detection can further include extracting the maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

In accordance with an embodiment, character classification can further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate.

In accordance with an embodiment, pair finding can further include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity.

In accordance with an embodiment, word line finding can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

In accordance with an embodiment, base line estimation can further include estimating the slope of the baseline using a clustering algorithm, then computing intercepts that minimize the minimum distance between baselines and glyphs. Each word candidate can have at least two lines in the top and bottom points of the glyphs, and if two or more words appear to have the same baselines, they can be merged and the lines can be reestimated. Further, in accordance with an embodiment, glyph refinement can be performed after baseline estimation is performed, where all glyphs that are classified as non-text, but fit into the baseline configuration, are included.

In accordance with an embodiment, word splitting can further include estimating the spaces between glyphs in each baseline and choosing a threshold, where any gap between characters greater than that threshold can be considered to be a word boundary (space) and can be marked as such.

In accordance with an embodiment, binarization can further include binarizing each region in the bounding box based at least in part on the threshold used to compute the regions character and the regions character's neighbors.

Returning to FIG. 1, the server in this example includes an engine component 114 (e.g., an optical character recognition (OCR) engine) that is used to decode the binarized region of cropped text. For example, the engine component can implement one or more pattern matching algorithms to determine textual content (e.g., the characters in the binarized region of cropped text such as the characters to make up a phone number) and a text entity type (e.g., a phone number, a physical address, a URL) for the binarized region of cropped text. The text entity type can be associated with a text entity type overlay 112 and functionality, where the text entity type overlay can be rendered on the interface and the functionality can instruct the portable computing device to e.g., open a web browser. It should be noted that although the example shown in this figure illustrates the engine component located on the server, the various embodiments described herein are not limited to this particular arrangement. Various alternative arrangements can be used within the scope of the embodiments described herein, as will be evident to one or ordinary skill in the art, such as including the engine component on the portable computing device.

The text entity type overlay can graphically display (e.g., using an icon) to a user a possible action/functionality that can be executed by tapping/selecting the text entity type overlay. For example, the text entity type overlay can be represented as a phone icon, and tapping/selecting the phone icon can be used to call the number associated with the text entity type overlay. The text entity type overlay can be based on an overlay template. The overlay template can be used as an overlay element to display on the interface, over a current view being captured by the camera, at least a portion of the textual content (e.g., a portion or all of a phone number) at a location over, near, or otherwise positioned with respect to the location of the recognized text. The overlay element can include at least one user-selectable element that enables the functionality associated with the text entity type to be performed with respect to the textual content. When an interaction with at least one user-selectable element of the overlay is detected, the functionality associated with the text entity type can be performed by the portable computing device or another component situated on the device. Additionally or alternatively, an application associated with the text entity type can also be associated with at least one user-selectable element of the overlay, and when the at least one user-selectable element is selected, the portable computing device can instantiate an instance of the application. Thereafter, the application can automatically be provided with the textual content corresponding to the text entity type, and the textual content can be used by the application to e.g., be inputted into a search engine or other application.

Examples of possible actions for different text entity types are displayed in Table 1. It will be evident that Table 1 is provided for purposes of illustration, and that in accordance with other embodiments, other text entity types and associated overlays/actions can be used.

TABLE 1

| Text Entity Type | Possible Actions/Overlays | Recognition Method |
| --- | --- | --- |
| Phone Number | Display phone icon, call number when tapped | Pattern Matching |
| Email Address | Display email icon, compose message to recipient when tapped | Pattern Matching |
| Website URL | Display link icon, open web browser when tapped | Pattern Matching and validation (e.g., match to list of common sites or ping url) |
| Address | Display map icon, drop pin on map when tapped | Pattern Matching and location information and map information |
| Business Card | Display contact info icon, add to contact list when tapped | Combination of Phone/Email/Address recognition and Dictionary of common names |
| Product Model Number | Display top product match, open detailed product information if tapped | Query a database of brand names and product model numbers |
| Book Spines | Display book name, author and price on top of book spine, tap for more details and purchase information | Query a database of book titles and authors |
| Credit Card | Display card icon, add to payment options when clicked | Card Edge finding and Pattern Matching with checksum validation |
| General Text (in English or foreign language) | Replace word with translation to/from another language | Dictionary Lookup |
| Price (in USD or foreign) | Display value in foreign currency Display possible restaurant tip values inline | Pattern Matching |
| Fruit Stickers (PLU codes) | Display fruit icon, and variety name | Dictionary lookup and context features for false positive suppression |
| Nutrition Label | Display nutrition icon, email to self or do some application specific logic (e.g., track number of servings eaten) | Pattern Matching and dictionary of possible nutrients and ingredients |
| Stock Market Ticker | Display current price and related info inline | Pattern Matching |

Referring to Table 1, by way of example, the left column shows a list of possible text entity types that can be determined from a binarized region of text, the middle column shows the text entity type overlay/action associated with the text entity type, and the right column shows the recognition method used by the OCR engine or other pattern matching engine to determine the text entity type. As described above, the portable computing device can be aimed in different directions, and the camera can be used to display an image (such as a phone number or a website URL) on the interface of the portable computing device. The image can be processed to generate a binarized region of cropped text, and the binarized region of cropped text can be decoded using one or more recognition methods to determine a text entity type for that binarized region of cropped text. The text entity type can be associated with a text entity type overlay/action that is displayed to the user at the location of the recognized text.

For example, as shown in Table 1, the recognition method used to determine a phone number text entity type is pattern matching, and the associated text entity type overlay/action is to display a phone icon at the location of the recognized text. When a user taps/selects the text entity type overlay, the portable device is instructed to call the number. As further shown in Table 1, other text entity types can be determined from a binarized region of cropped text, and these text entity types can have a text entity type overlay/action associated therewith.

In accordance with an embodiment, in addition to the predefined entities shown in Table 1, other results can be determined from the text in the image. For example, the text detected in the image can be provided to a search engine (e.g., a product search engine or other generic search engine), and the search engine can be used to selectively display search results based on the provided text. Providing results from the search engine can be advantageous in several ways, such as, but not limited to, extending the predefined text entity types to include results generated from a search engine, using the capabilities of the search engine to correct for text errors, and leveraging the search engine intelligence to display, provide or otherwise determine results based on the provided text.

For example, the text "www.Advil.com" was captured using a portable computing device, and was inputted in a search engine operable on the portable computing device. The captured text includes an error (i.e., the "|" should be the letter "l"). Leveraging the search engine's intelligence, the search engine can correct the spelling of the URL, determine that the characters make up a URL, and provide a URL link as an option to be selected and/or otherwise interacted with. In accordance with another embodiment, the text "www.teance.com" can be provided into a product search engine or other search engine. Similar to as described above, the search engine can determine that the characters make up a URL, and can provide a URL link as an option to be selected. Additionally or alternatively, the product search engine can provide a list of products from "www.teance.com" that the user can selected or otherwise interact with.

Returning to FIG. 1, the server communicates the text entity type overlay to the portable computing device, where the processing component is used to render the text entity type overlay on the interface at the location of the text recognized. The text entity type overlay, when selected, can perform an action such as calling a phone number, opening a web browser window, adding contact information to a contact, etc. Other examples of actions that can be performed by the portable computing device upon tapping the text entity type overlay can be seen in Table 1, but the various embodiments described herein are not limited to the examples described or listed in Table 1. Various alternative text entity types and associated text entity type overlays can be used within the scope of the embodiments described herein.

Figure 2A:
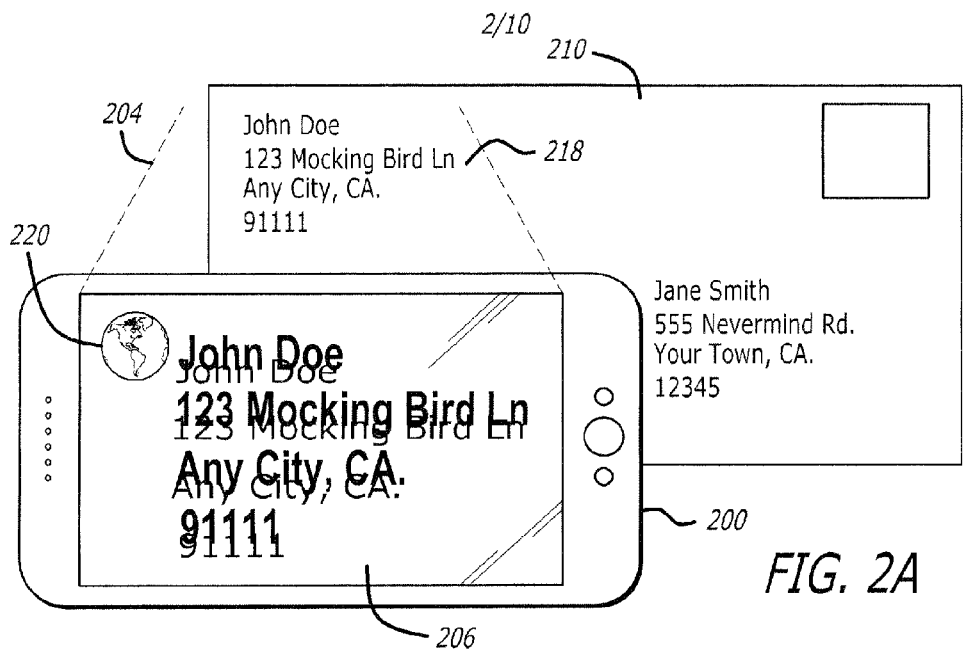
FIGS. 2A-2D illustrate an example implementation where a user holding a portable computing device is provided an overlay in a live field of view of a camera based on a detected address, in accordance with an embodiment.

FIGS. 2A-2D illustrate an example implementation where a user holding a portable computing device is provided an overlay in a live field of view of a camera based on a detected address, in accordance with an embodiment. As shown in FIG. 2A, a user is holding a portable computing device 200 above a mail envelope 210. The portable computing device includes a camera and an interface 206 that displays an image captured in an active field of view 204 of the camera. The mail envelope contains a physical address 218 of a location and, in this example, the user is seeking directions to that location. In order to obtain directions to the location, the user can input the physical address into a mapping application of the user's portable computing device. Alternatively, in accordance with at least one embodiment, the user can point the camera of the portable computing device at the portion of the mail envelope containing the address. Thereafter, the user will be presented with a text entity type overlay 212 on the interface of the portable computing device. The text entity type overlay may be displayed above or near the physical address. When the user selects the text entity type overlay, the portable computing device can automatically instantiate an instance of a mapping application populated with the desired physical address. Alternatively, when the user selects the text entity type overlay, the user can be presented with options such as mapping the address, saving the address, and sharing the address.

For example, a processing component of the portable computing device processes the image containing the physical address by implementing algorithms that detect and recognize the location of the physical address in the image. The region of the image that includes the physical address is cropped to create a region of cropped text containing the physical address, and the region of cropped text is binarized and communicated to an engine component imbedded in the portable mobile device for further processing. Alternatively, the binarized cropped text can be processed at a server having the engine component.

The engine component (e.g., an optical character recognition (OCR) engine) is used to decode the binarized region of cropped text to determine a text entity type for the binarized region of cropped text. For example, the engine component can include a machine vision algorithm (and other pattern matching algorithms) that makes use of various techniques to analyze the binarized region of cropped text to identify patterns of text that would indicate the presence of a text entity type, such as a physical address. Upon receiving the binarized region of cropped text, the engine component executes one or more pattern matching algorithms to determine a text entity type for the binarized region of cropped text. As shown in FIG. 2A, the text entity type determined for binarized region of cropped text is that of a physical address.

Figure 2B:
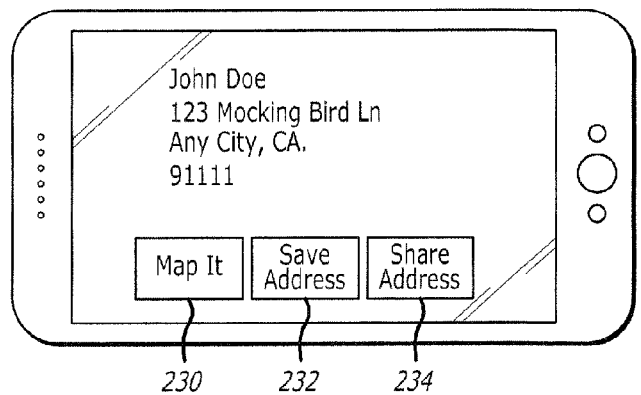

The text entity type is associated with a text entity type overlay that can be rendered on the interface of the portable computing device. The text entity type overlay can be represented as a map icon 220, which indicates that a physical address has been identified. Tapping/selecting the map icon can be used to instantiate an instance of a mapping application populated with the desired physical address. For example, as shown in FIG. 2B, when the user taps/selects the map icon, the user is prompted to perform a specific action, such as mapping the address 230, saving the address 232, and sharing the address 234.

Figure 2C:
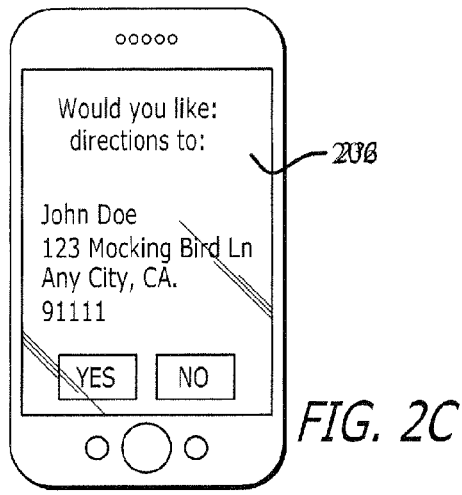
Figure 2D:
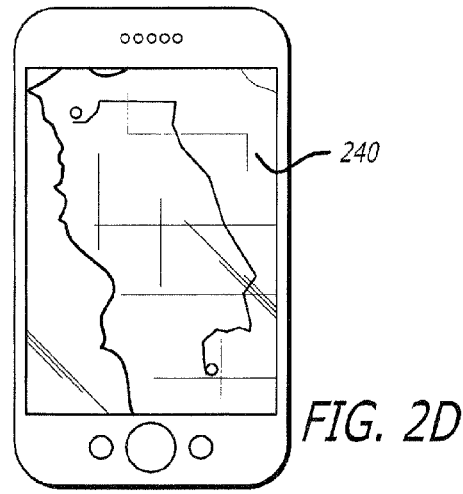

In accordance with an embodiment, the user selected 'Map It', and as shown in FIG. 2C, the user can first confirm an intent by pressing a 'YES' button whereby a map with directions to the address are displayed on the interface 206 of the portable computing device. Alternatively, a predetermined routine or workflow associated with the text entity type overlay can be executed. As shown in FIG. 2D, the predetermined routine causes a map application 240 to be opened and directions to the address displayed.

Figure 3A:
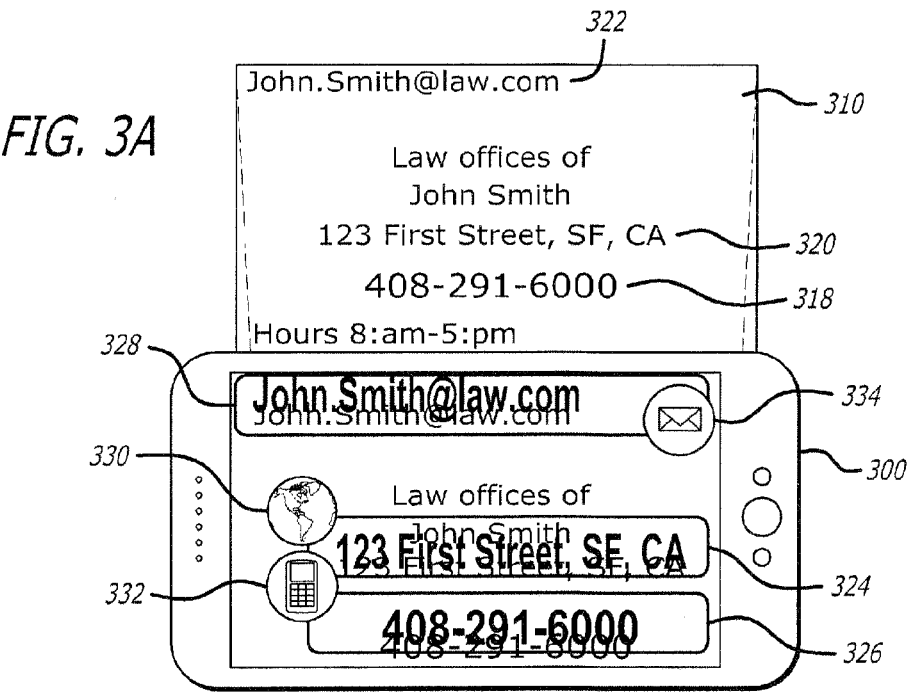
FIGS. 3A-3D illustrate an example implementation where a user holding a portable computing device is provided an overlay in a live field of view of a camera based on a detected on a phone number, in accordance with an embodiment.

FIGS. 3A-3D illustrate an example implementation where a user holding a portable computing device is provided an overlay in a live field of view of a camera based on a detected on a phone number, in accordance with an embodiment. As shown in FIG. 3A, a user is holding a portable computing device 300 above a business card 310. As described above, the portable computing device includes a camera and an interface 306 that displays an image captured in an active field of view 304 of the camera. The business card contains a phone number 318, a physical address 320, and an email address 322. When the user points the camera of the portable computing device at the business card, the image of the business card will be processed as described above; i.e., a text entity type is determined, the text entity type is associated with a text entity type overlay, and the text entity type overlay is rendered on the interface of the portable computing device.

Figure 3B:
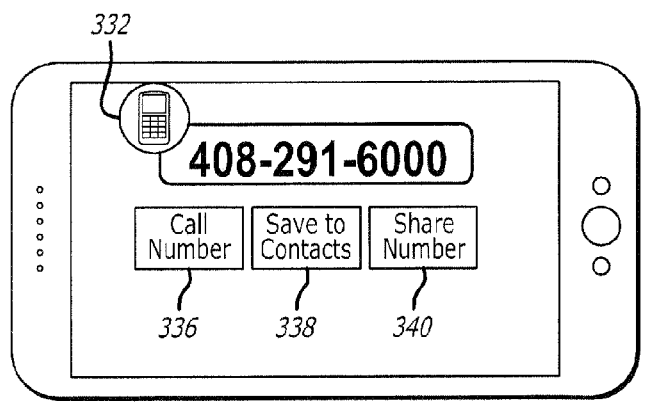

As shown in FIG. 3A, the user is presented a text entity type overly for the phone number 326, the physical address 324, and the email address 328. The text entity type overly for the phone number can be represented by a phone icon 330, the text entity type overlay for the physical address can be represented by a map icon 332, and the text entity type over for the email address can be represented by an envelope icon 334. Depending on the icon selected, the user can be presented with options on how to proceed. For example, as shown in FIG. 3B, selecting the phone icon 332 can launch a phone application having options to call the phone number 336, save the phone number as contact information 338, and share the phone number 340.

Figure 3C:
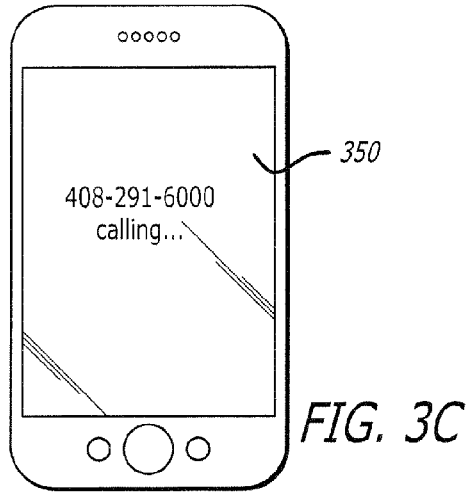
Figure 3D:
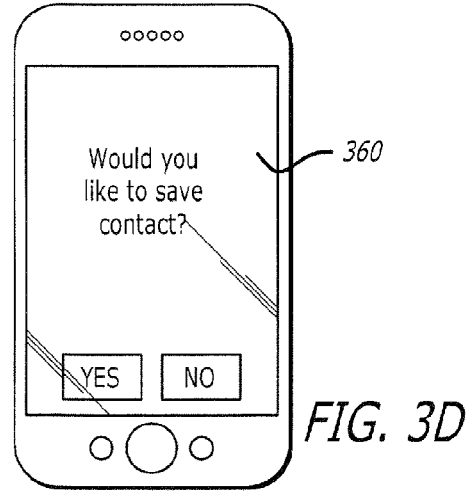

Alternatively, in accordance with an embodiment, the user can set an action priority associated with this type of text entity type overlay that automatically executes a predetermined operation, such as dialing a phone number when a text entity type overlay is selected that is associated with a phone number. For example, as shown in FIG. 3C, when the user selects the phone icon, the portable mobile device automatically dials the phone number 350. Alternatively, the predetermined operation can be set to save the phone number, and as shown in FIG. 3D, when the user selects the phone icon the user can be presented with the option to launch an address book application for saving the phone number as contact information 360.

Figure 4A:
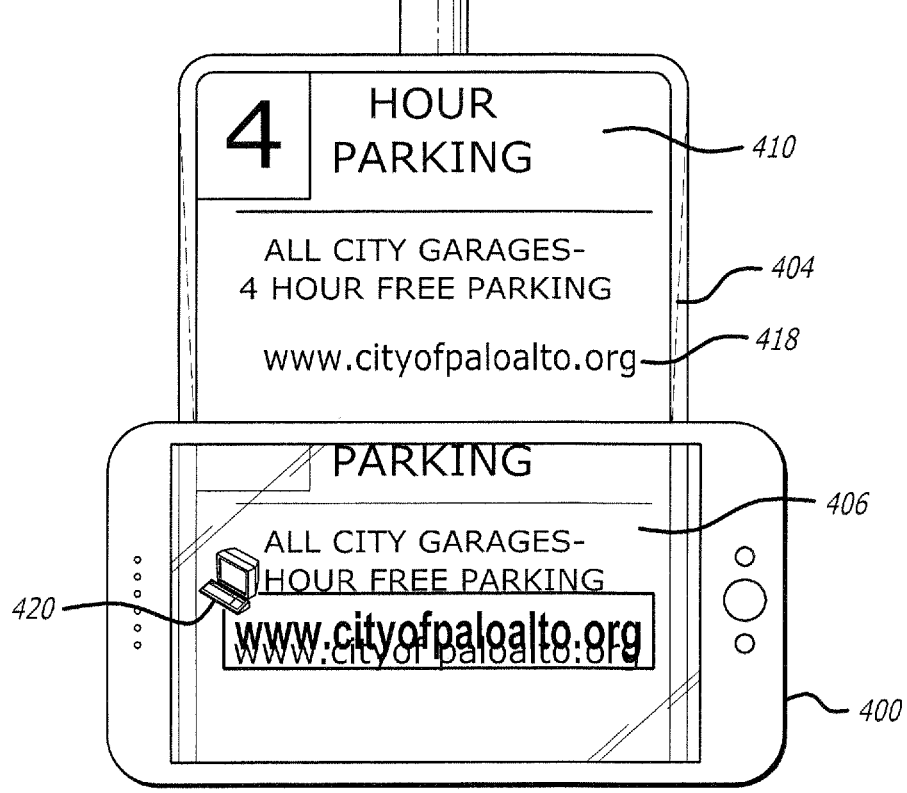
FIGS. 4A-4B illustrate an example implementation where a user holding a portable computing device is provided an overlay in a live field of view of a camera based on a detected URL, in accordance with an embodiment.
Figure 4B:
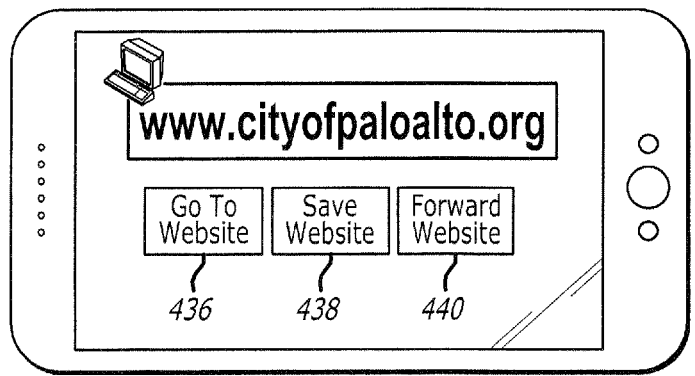

FIGS. 4A-4B illustrate an example implementation where a user holding a portable computing device is provided an overlay in a live field of view of a camera based on a detected URL, in accordance with an embodiment. As shown in FIG. 4A, a user is pointing a portable computing device 400 at a street sign 410. As described above, the portable computing device includes a camera and an interface 406 that displays an image captured in an active field of view 404 of the camera. The street sign has displayed thereon a website URL 418, and the user may want to access the website URL from their portable computing device. When the user points the camera of the portable computing device at the street sign, the image of the street sign will be processed as described above; i.e., a text entity type is determined, the text entity type is associated with a text entity type overlay, and the text entity type overlay is rendered on the interface of the portable computing device. The text entity type overlay can be represented as a computer icon 420, and can include the website URL displayed on the street sign.

Tapping/selecting the computer icon can open a web browser that navigates the user to the displayed website URL. Alternatively, tapping/selecting the computer icon can provide options to the user on how to proceed. For example, as shown in FIG. 4B, selecting computer icon can launch an application that includes options to go to the website 436, save the website as a bookmark 438, and share the website 440.

Figure 5:
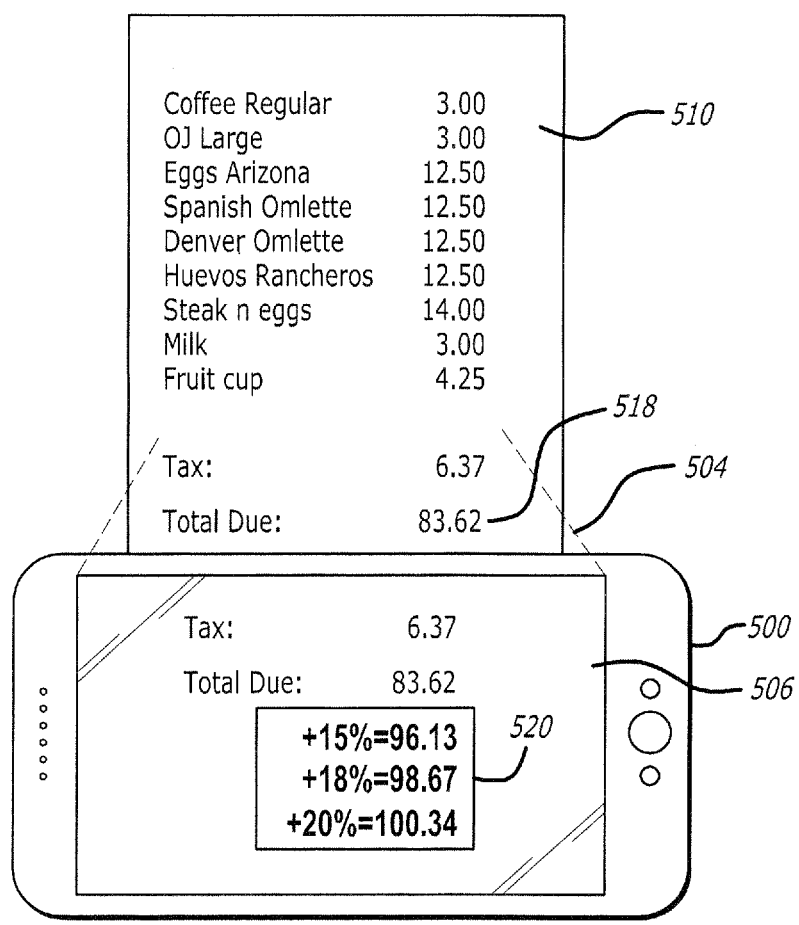
FIG. 5 illustrates an example implementation where a user holding a portable computing device is provided an overlay in a live field of view of a camera based on a detected receipt, in accordance with an embodiment.

FIG. 5 illustrates an example implementation where a user holding a portable computing device is provided an overlay in a live field of view of a camera based on a detected receipt, in accordance with an embodiment. As shown in FIG. 5, a user is pointing a portable computing device 500 at a receipt 510. As described above, the portable computing device includes a camera and an interface 506 that displays an image captured in an active field of view 504 of the camera. The receipt includes one or more purchases and a total amount due 518. The user may want to calculate a restaurant tip from the total amount due. When the user points the camera of the portable computing device at the receipt, the image of the receipt will be processed as described above; i.e., a text entity type is determined, the text entity type is associated with a text entity type overlay.

Thereafter, the text entity type overlay is rendered on the interface 506 displaying the active field of view of the camera. The text entity type overlay 520 can display one or more restaurant tip values. For example, the text entity type overlay can display a total amount due including a 15% tip, an 18% tip, and a 20% tip. Additionally, the total amount due can be calculated based on other tip values which can be set by the user.

Figure 6A:
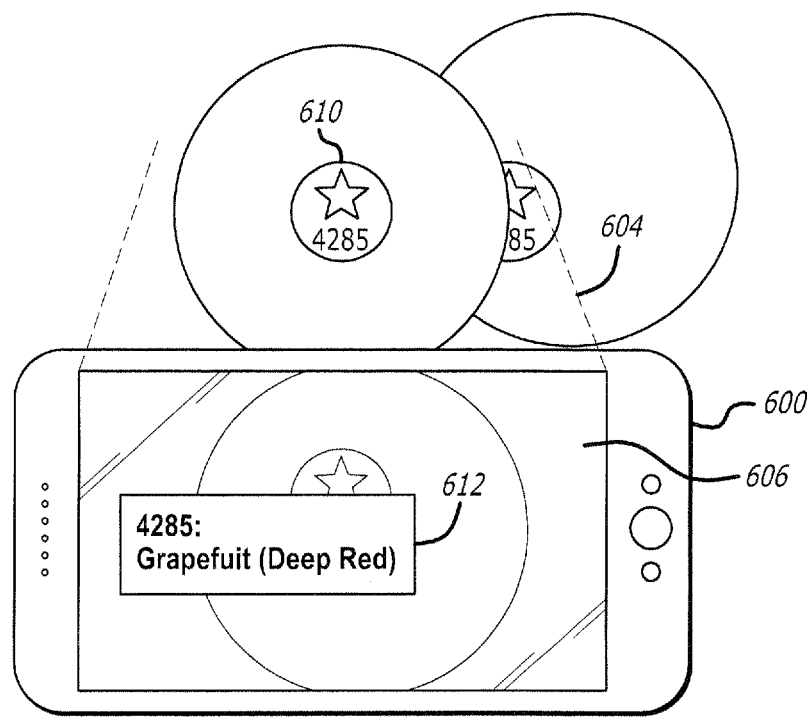
FIGS. 6A-6B illustrates an example implementation where a user holding a portable computing device is provided an overlay in a live field of view of a camera based on a detected barcode, in accordance with an embodiment.
Figure 6B:
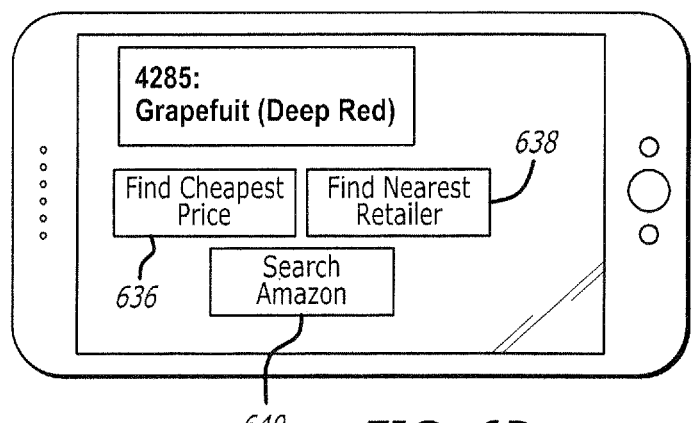

FIGS. 6A-6B illustrate an example implementation where a user holding a portable computing device is provided an overlay in a live field of view of a camera based on a detected barcode, in accordance with an embodiment. As shown in FIG. 6A, a user is pointing a portable computing device 600 at a piece of fruit having a product identification number 610 attached thereon. As described above, the portable computing device includes a camera and an interface 606 that displays an image captured in an active field of view 604 of the camera. Although the product identification number displayed is associated with a piece of fruit, the product identification number can be associated with any item, such as a computer, an item of clothing, etc. Additionally or alternatively, the portable computing device can be used to identify barcodes, or other codes when the code is captured in the active field of view of the camera. When the user points the camera at the product identification number, the image of the product identification number can be processed as described above; i.e., a text entity type is determined, the text entity type is associated with a text entity type overlay, and the text entity type overlay is rendered on the interface of the portable computing device.

The text entity type overlay 612 can display the variety name of the fruit and/or other information relating to the fruit. This information can include the price of the fruit as sold by other venders, nutritional value of the fruit and/or general information about the fruit. The information can be retrieved from a server or other device that aggregates barcode and associated item information. Tapping/selecting the text entity type overlay 612 can open a web browser that navigates to a store to purchase the fruit (e.g., amazon.com). Alternatively, tapping/selecting the text entity type overlay can provide options to the user on how to proceed. For example, as shown in FIG. 6B, selecting the text entity type overlay can launch an application that includes options to find the cheapest price of the fruit 636, find the nearest retailer of the fruit 638, and search the fruit on a website 640 such as www.amazon.com.

Figure 7:
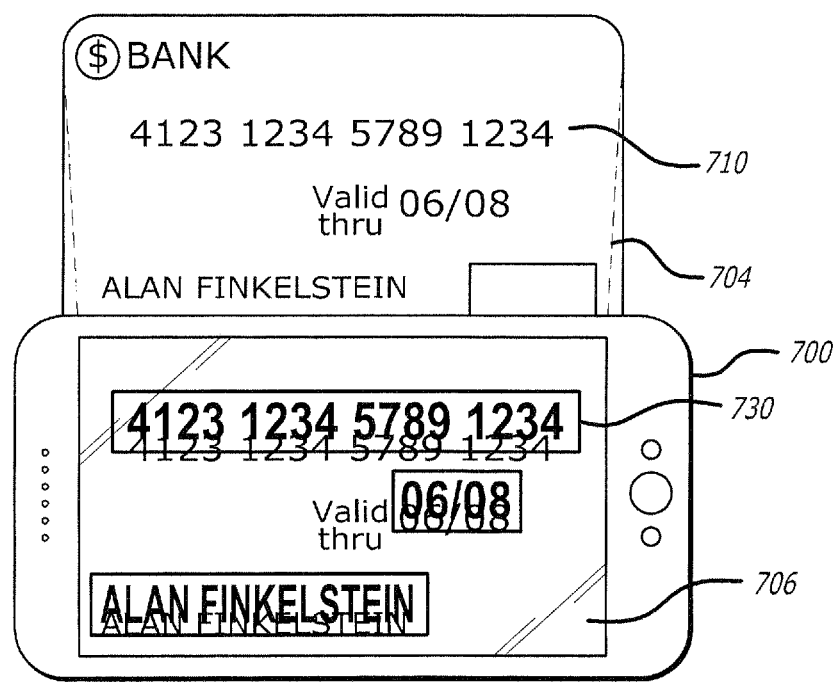
FIG. 7 illustrates an example implementation where a user holding a portable computing device is provided an overlay in a live field of view of a camera based on detected credit card information, in accordance with an embodiment.

FIG. 7 illustrates an example implementation where a user holding a portable computing device is provided an overlay in a live field of view of a camera based on detected credit card information, in accordance with an embodiment. As shown in FIG. 7, a user is pointing a portable computing device 700 at a credit card 710. The user can be trying to, e.g., import credit card information into an application or web site to make a purchase, store information pertaining to the credit card onto the portable computing device, or perform another action with the credit card information. When the user points the camera of the portable computing device at the credit card, the image of the credit card will be processed as described above; i.e., a text entity type is determined, the text entity type is associated with a text entity type overlay, and the text entity type overlay is rendered on the interface of the portable computing device.

The text entity type overlay can display the user's credit card information. Tapping/selecting the text entity type overlay can initiate a process to store the user's credit card information. Additionally or alternatively, tapping/selecting the text entity type overlay can communicate the user's credit card information to an application or website to make a purchase, a reservation, etc.

Figure 8:
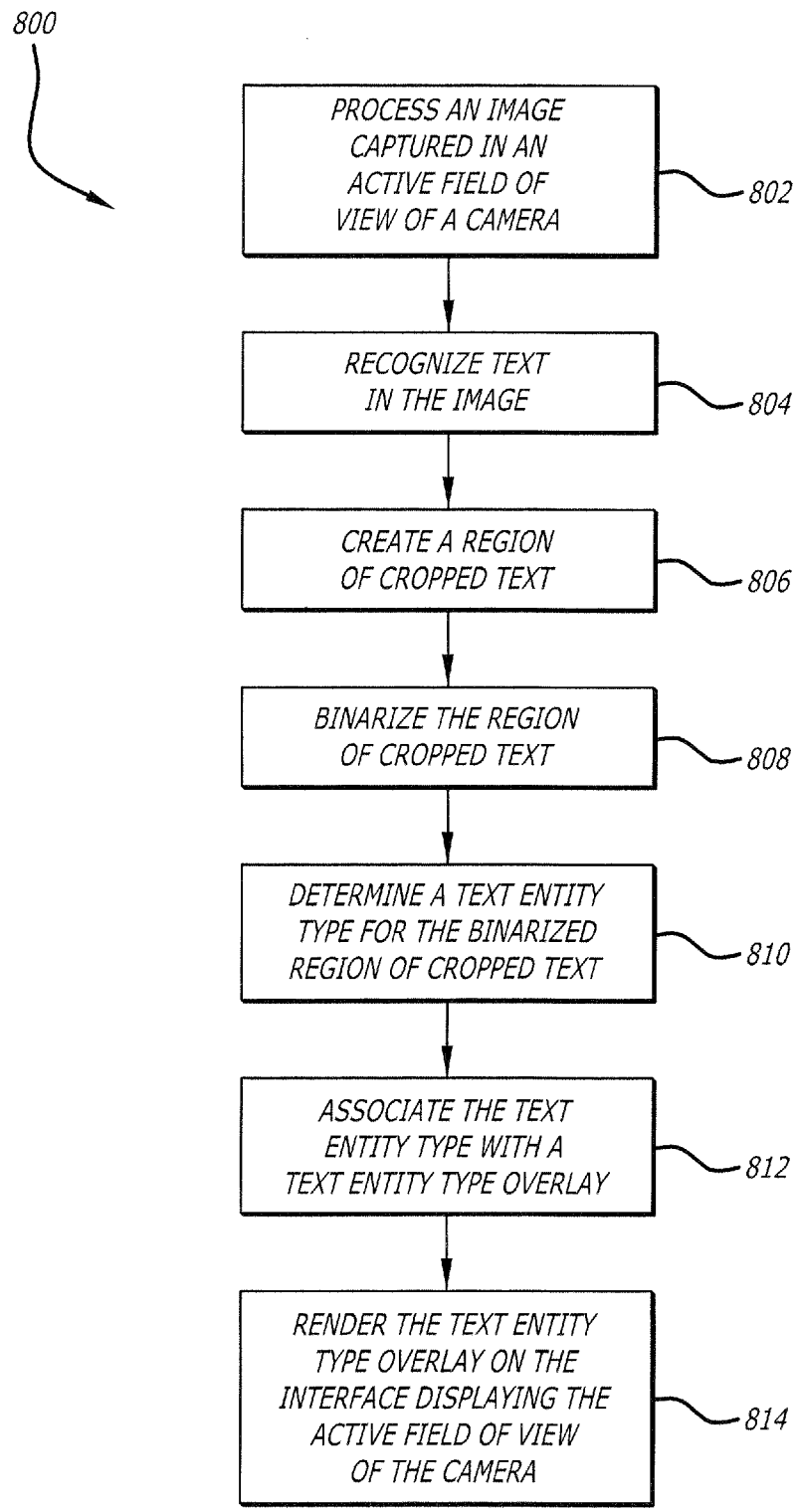
FIG. 8 illustrates an example process for providing augmented reality overlays in a live field of view of a camera based on a detected image, in accordance with various embodiments.

FIG. 8 illustrates an example process for providing augmented reality overlays in a live field of view of a computing device based on a detected image captured by a camera of the device, in accordance with various embodiments. It should be understood that, for any process described herein, that there can be additional or fewer steps performed in similar or alternative orders, or in parallel, within the scope of the various embodiments unless otherwise stated. At step 802, an image captured in an active field of view of a camera is processed. The processed image can be the image displayed on an interface of a portable computing device, where the camera can be integrated into the portable computing device. The image can be anything capable of being displayed on the interface of the camera. For example, the image can be of a business card, a street sign, etc. It should be noted that the image is not a snapshot of what the camera is (or was) being pointed at for a particular instant; rather, the image is the current (or live) rendering of what the camera is presently being pointed at.

At step 804, the text in the image is recognized. The portable computing device can execute algorithms that detect and recognize the location of the text. For example, as described above, detecting text in the image can include locating the maximally stable extremal regions. These regions can be extracted and analyzed to detect characters, and the detected characters can be connected and aggregated. A text line algorithm can be used to determine the orientation of the connected characters, and once the orientation of the characters is determined, a binary mask of the region containing the characters can be extracted. Thereafter, the binary mask can be communicated to an optical character recognition engine (OCR) for further processing.

At step 806, the region of the image containing the text is cropped to create a region of cropped text. At step 808, the region of cropped text is binarized, and is communicated to a server. The server includes an OCR engine and/or other pattern matching algorithms that are used to decode the binarized region of cropped text to determine a text entity type. Alternatively, the binarized region of cropped text can be processed by an OCR engine or other pattern matching engine situated on the portable mobile device.

At step 810, the binarized region of cropped text is decoded using the OCR engine to determine a text entity type for the binarized region of cropped text. As shown in Table 1, example text entity types that can be determined from the binarized region of cropped text can include phone numbers, nutrition labels, stock market tickers, etc. At step 812, the text entity type is associated with a text entity type overlay. The text entity type overlay can graphically display (e.g., using an icon or other display method) to a user a possible action that can be executed by tapping/selecting the text entity type overlay.

For example, the text entity type overlay can be represented as a nutrition icon, and tapping/selecting the nutrition icon can open an email client to email the nutrition information, or tapping/selecting the nutrition icon can perform some other application specific logic such as tracking a number of servings eaten. In some instances, the information needed to facilitate execution of the text entity type overlay resides on the user's portable mobile device. Examples of this type of information can include contact information or other information stored on the user's portable computing device. In other instances, the information needed to execute the text entity type overlay is retrieved form a server, a database, or another device in communication with the user's portable computing device. The user's portable computing device would connect with the storage/data serving device to retrieve the data needed. Examples of this type of information can include data from a database of product model numbers.

The text entity type overlay is communicated to the portable computing device, and at step 814, the text entity type overlay is rendered on the interface displaying the active field of view of the camera at each location of the text recognized. As described above, the text entity type overlay, when selected, can perform an action such as calling a phone number, opening up a web browser, adding contact information to a contact, or another action such as those listed in Table 1.

Figures 9A, 9B:
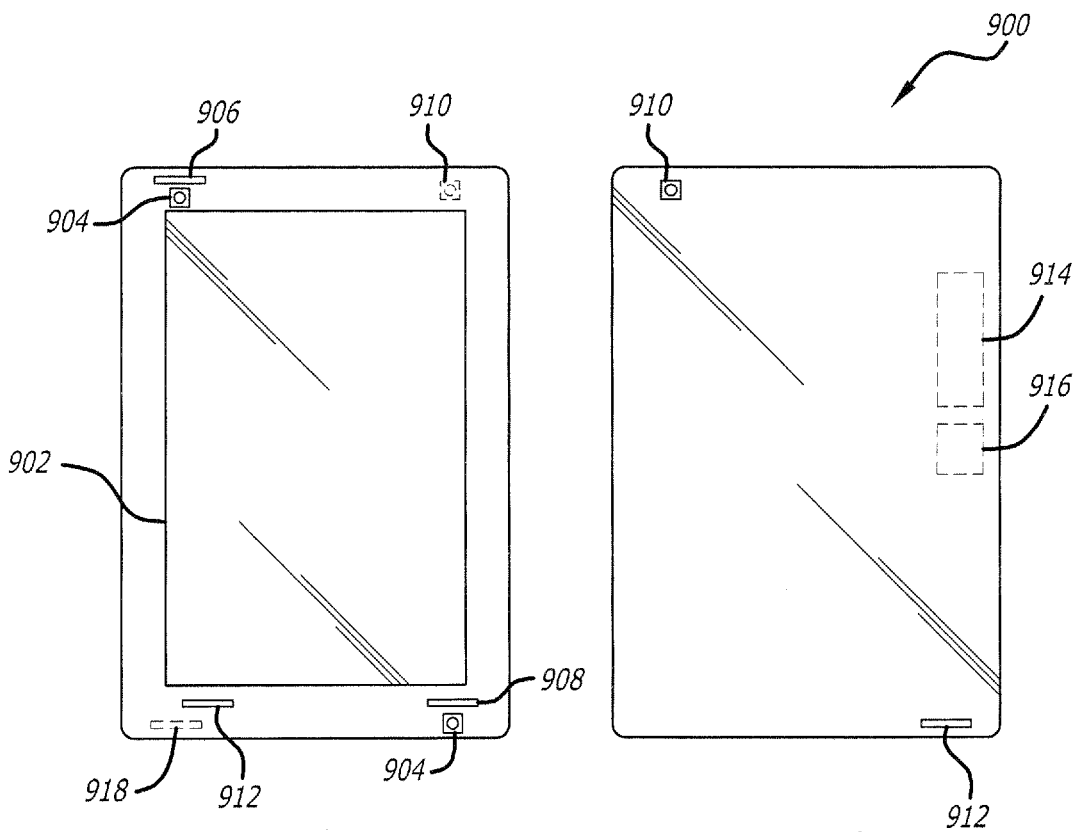
FIGS. 9A and 9B illustrate front and back views of an example portable computing device that can be used in accordance with various embodiments.

FIGS. 9A and 9B illustrate front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
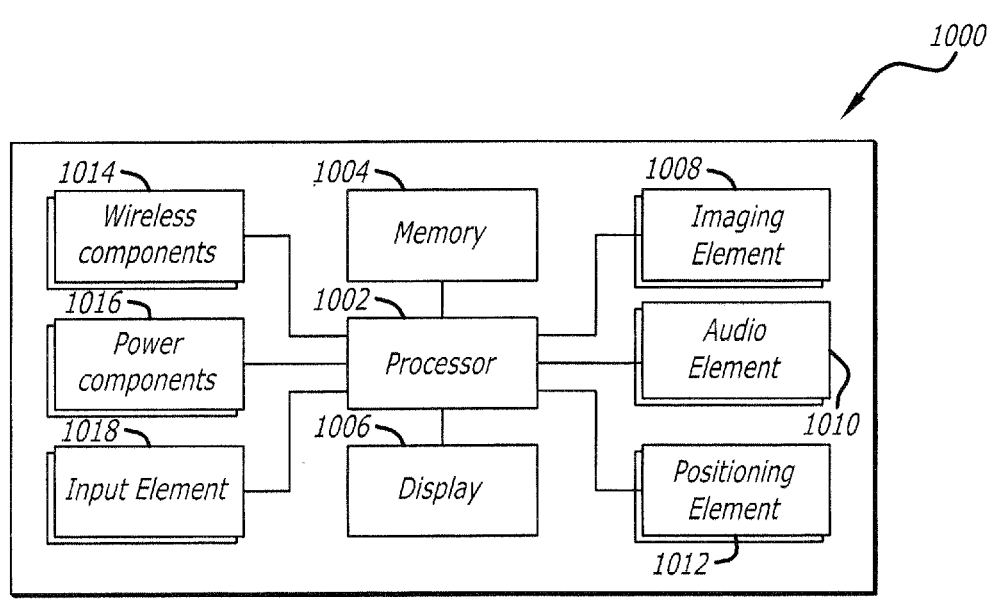
FIG. 10 illustrates an example set of basic components of a portable computing device, such as the device described with respect to FIGS. 9A and 9B.

FIG. 10 illustrates a set of basic components of an electronic computing device 1000 such as the device 900 described with respect to FIGS. 9A and 9B. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
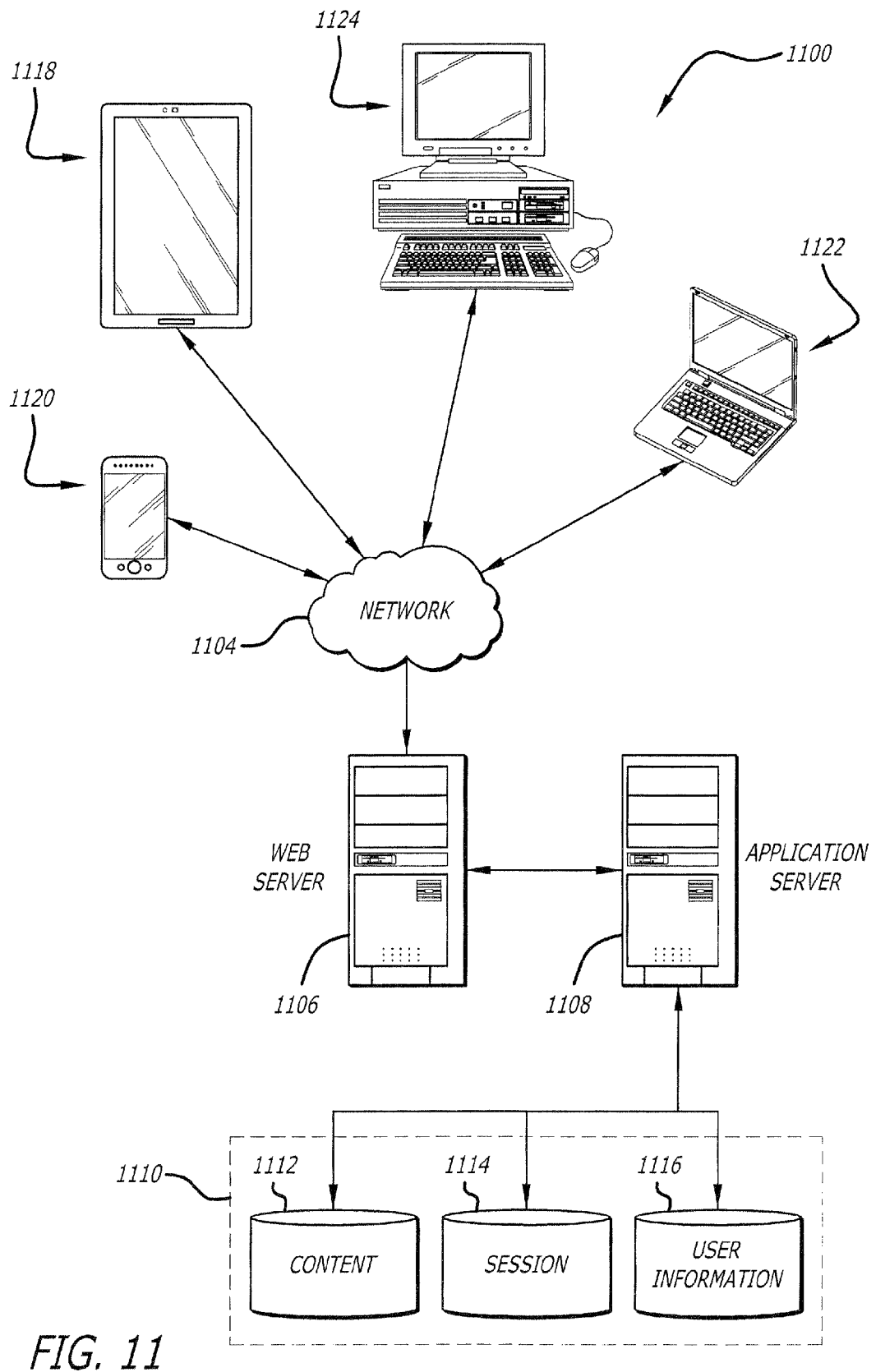
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1118, 1120, 1122, and 1124, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1118, 1120, 1122, and 1124 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on any one of the user devices 1118, 1120, 1122 and 1124. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for providing an overlay in a live camera view, the method comprising:
    under control of one or more computer systems configured with executable instructions,
        displaying an image on a display element of a computing device, the image being captured by a camera of the computing device;
        analyzing the image to locate a region of text in the image;
        analyzing the region of text using a character recognition process to determine textual content for the region of text and a text entity type for the region of text;
        determining an overlay template associated with the text entity type;
        determining functionality associated with the text entity type; and
        displaying on the display element, over a current view being captured by the camera, at least a portion of the textual content using the overlay template as an overlay element, the overlay element being rendered with respect to a location of the text recognized, the overlay element including at least one user-selectable element enabling the functionality associated with the text entity type to be performed with respect to the textual content.

2. The computer implemented method of claim 1, further comprising:
    detecting an interaction with the at least one user-selectable element of the overlay element; and
    performing the functionality associated with the text entity type.

3. The computer implemented method of claim 1, further comprising:
    determining an application associated with the text entity type;
    associating the application with the at least one user-selectable element of the overlay;
    instantiating an instance of the application when the at least one user-selectable element is selected; and
    automatically providing the textual content corresponding to the text entity type to the application for use by the application.

4. A computer implemented method, comprising:
    under the control of one or more computer systems configured with executable instructions,
        recognizing text in an image captured by at least one camera of a computing device, the image being rendered on a display element of the computing device;
        determining a text entity type based on the recognized text;
        determining an overlay for the text entity type;
        determining functionality associated with the text entity type; and rendering the overlay on the display element over a current view being captured by the camera, wherein detecting an interaction with the overlay causes the associated function to be performed using the recognized text.

5. The computer implemented method of claim 4, wherein the recognizing of text further includes:
analyzing the image to locate a region of text in the image;
cropping the region of the image containing the text to create a region of cropped text;
binarizing the region of cropped text; and
communicating the binarized region of cropped text to a character recognition process for processing.

6. The computer implemented method of claim 5, wherein processing by the character recognition process includes:
decoding the binarized region of cropped text to determine a text entity type for the region of cropped text;
determining the overlay and functionality associated with the text entity type; and
communicating the overlay to the display element of the computing device.

7. The computer implemented method of claim 4, further comprising:
prompting a user to select between a plurality of functions associated with the overlay, the overlay including at least one user-selectable element enabling the functionality associated with the text entity type;
receiving a selection at the at least one user-selectable element indicating one of the plurality of functions associated with the overlay; and
performing the selected function.

8. The computer implemented method of claim 4, further comprising:
detecting an interaction with a user-selectable element of the overlay;
prompting a user to confirm performance of the function associated with the overlay before performance; and
performing the function in response to receiving confirmation.

9. The computer implemented method of claim 4, further comprising:
identifying the text entity type associated with the text based at least in part on an output from an optical character recognition algorithm.

10. The computer implemented method of claim 4, further comprising:
determining an application associated with the text entity type;
associating the application with the overlay;
instantiating an instance of the application when the overlay is selected; and
automatically providing the text corresponding to the text entity type to the application for use by the application.

11. A computing system, comprising:
at least one processor; and
memory including instructions that, when executed by the processor, cause the computing system to:
recognize text in an image captured by at least one camera of a computing device, the image rendered on a display element of the computing device;
determine a text entity type based on the text;
determine an overlay for the text entity type;
determine functionality associated with the text entity type; and
render the overlay on the display element over a current view being captured by the camera, wherein detecting an interaction with the overlay causes an associated function to be performed using the recognized text.

12. The computing system of claim 11, wherein recognizing the text in the image and rendering the overlay are performed locally on the computing device.

13. The computing system of claim 11, wherein when recognizing the text, the at least one processor is further adapted to:
analyze the image to locate a region of text in the image;
crop the region of the image containing the text to create a region of cropped text;
binarize the region of cropped text; and
communicate the binarized region of cropped text to a character recognition process for processing.

14. The computing system of claim 13, wherein the character recognition process is adapted to:
decode the binarized region of cropped text to determine a text entity type for the region of cropped text;
determine an overlay and functionality associated with the text entity type; and
communicate the overlay to the display element of the computing device.

15. The computing system of claim 14, wherein decoding the binarized region of cropped text and associating the text entity type with the overlay is performed by a remote server in communication with the computing device.

16. The computing system of claim 11, wherein when the display element detects an interaction with the overlay, the computing device is adapted to perform the function associated with the text entity type.

17. The computing system of claim 11, wherein the processor is adapted to:
determine an application associated with the text entity type;
associate the application with the overlay;
instantiate an instance of the application when the overlay is selected; and
automatically provide the text corresponding to the text entity type to the application for use by the application.

18. The computing system of claim 11, wherein the display element prompts a user to confirm performance of the function associated with the overlay, and wherein the computing device performs the function in response to receiving confirmation.

19. A non-transitory computer readable storage medium storing one or more sequences of instructions executable by one or more processors to perform a set of operations comprising:
displaying an image on a display element of a computing device;
analyzing the image to locate a region of text in the image;
analyzing the region of text to determine a text entity type for the region of text;
determining an overlay associated with the text entity type;
determining functionality associated with the text entity type; and
displaying the overlay on the display element over a current view being captured by the computing device, the overlay including at least one user-selectable element enabling the functionality associated with the text entity type to be performed with respect to the text.

20. The non-transitory computer readable storage medium of claim 19, further comprising instructions executed by the one or more processors to perform the operations of:
detecting an interaction with the user-selectable element of the overlay; and performing the functionality associated with the text entity type.

21. The non-transitory computer readable storage medium of claim 19, further comprising instructions executed by the one or more processors to perform the operations of:
    determining an application associated with the text entity type;
    associating the application with the at least one user-selectable element of the overlay;
    instantiating an instance of the application when the at least one user-selectable element is selected; and
    automatically providing the text corresponding to the text entity type to the application for use by the application.

22. The non-transitory computer readable storage medium of claim 19, further comprising instructions executed by the one or more processors to perform the operations of:
    cropping the region of the image containing the text to create a region of cropped text;
    binarizing the region of cropped text; and
    communicating the binarized region of cropped text to a character recognition process to determine the text entity type for the region of text.

23. The non-transitory computer readable storage medium of claim 19, further comprising instructions executed by the one or more processors to perform the operations of:
    detecting an interaction with the user-selectable element of the overlay; and
    prompting a user to confirm performance of the function associated with the overlay, and wherein the computing device performs the function in response to receiving confirmation.

24. The non-transitory computer readable storage medium of claim 19, wherein the text entity type is one of a phone number, an email address, a website URL, a physical address, a business card, a product model number, a book spine, a credit card, a word in a foreign language, a price in a foreign currency, a barcode, a nutrition label and a stock market ticker.

* * * * *